Jan. 4, 1966 R. B. BASHAM 3,227,892

TRANSISTOR CHOPPERS

Filed March 29, 1962

Raymond B. Basham
INVENTOR.

BY Wm. T. Wofford
Attorney

United States Patent Office 3,227,892
Patented Jan. 4, 1966

3,227,892
TRANSISTOR CHOPPERS

Raymond B. Basham, Fort Worth, Tex., assignor to Rawco Instruments, Inc., Fort Worth, Tex.

Filed Mar. 29, 1962, Ser. No. 183,652
6 Claims. (Cl. 307—88.5)

My invention relates to transistor choppers, and more particularly to transistor choppers which are designed for effective operation at low signal input levels.

Transistor choppers have a number of inherent advantages over mechanical type choppers. Among these are small size, low power requirements, capability of operating over wide frequency ranges and at higher frequencies, no moving parts to wear, and high shock resistance. In spite of such inherent advantages, transistor choppers have been severely limited because of the problem of noise. It has been desirable to operate transistor choppers under conditions wherein the magnitude of the input signals is comparable to the magnitude of what has appeared to be irreducible noise levels. Under such conditions, it is apparent that there is a severe problem of confusion of desired signals with noise. This problem is aggravated when the operation involves high input impedances. Considerable work has been done in the area of reducing the noise levels in transistor choppers. There have been numerous approaches to the problem in the prior art of which I am aware, but even the optimum results heretofore attained, have left much to be desired.

It is accordingly the general object of my invention to provide improved transistor choppers wherein the noise problem is reduced to a maximum extent.

Another object of my invention is to provide improved transistor choppers capable of effective operation at very low signal levels with no noise confusion.

Another object of my invention is to provide improved transistor choppers wherein noise effects are effectively neutralized.

Another object of my invention is to provide improved transistor choppers wherein noise due to "offset voltage" is effectively neutralized.

Another object of my invention is to provide improved transistor choppers wherein noise due to "switching transients" is effectively neutralized.

Another object of my invention is to provide improved transistor choppers having low noise levels and wherein only one transistor is required for each switching operation.

Another object of my invention is to provide improved transistor choppers having low noise levels and wherein there is no necessity to utilize transistors in matched pairs.

Another object of my invention is to provide transistor choppers where temperature drift effects are neutralized.

Another object of my invention is to provide transistor choppers incorporating improved drive transformer structure and arrangements.

These and other objects are effected by my invention as will be apparent from the following description taken in accordance with the accompanying drawings, forming a part of this application, in which.

Figure 1:
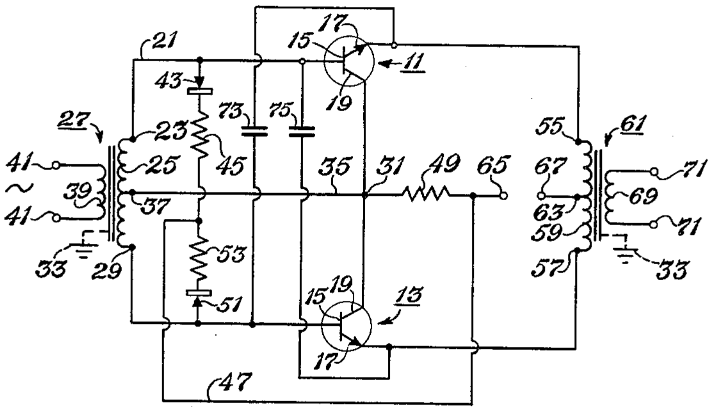
FIG. 1 is a schematic circuit diagram showing a full wave transistor chopper in accordance with a preferred embodiment of my invention.

Referring now to the drawings, in FIG. 1 there is shown a schematic circuit diagram of a full wave transistor chopper in accordance with a preferred embodiment of my invention. The transistor chopper of FIG. 1 utilizes first and second transistors 11, 13, each having a base electrode 15, an emitter electrode 17, and a collector electrode 19. The base electrode 15 of the first transistor 11 is connected via lead 21 to a first end terminal 23 of the center-tapped secondary winding 25 of a chopper drive transformer 27, while the base electrode 15 of the second transistor 13 is connected via lead 27 to the second end terminal 29 of the secondary winding 25. The collector electrodes 19 of the transistors 11, 13 are connected to a common terminal 31 and also via lead 35 to the center-tapped terminal 37 of the drive transformer secondary winding 25. The primary winding 39 of the drive transformer has a pair of input terminals 41, which may be connected to a suitable alternating current source (not shown). A first diode 43 is connected to the first end terminal 23 of the drive transformer secondary 25 and in series with a first voltage divider resistor 45 and via lead 47 in series with a neutralizing resistor 49 to the common terminal 31, which is common both to the collector electrodes 19 and the drive transformer center tap terminal 37. A second diode 51 is connected to the second end terminal 29 of the drive transformer secondary 25 and in series with a second voltage divider resistor 53 and also via lead 47 in series with the neutralizing resistor 49 to the common terminal 31. Each diode 43, 51 is poled to conduct in the direction away from the respective transformer secondary end terminal 23, 29 to which it is connected. The emitter electrodes 17 of the transistors 11, 13 are connected respectively to first and second end terminals 55, 57 of the center-tapped primary winding 59 of an output transformer 61, the center tap terminal 63 of which is connected in series with a pair of chopper input terminals 65, 67 and the neutralizing resistor 49 to the common terminal 31. The secondary winding 69 of the output transformer 61 is provided with a pair of terminals 71 at which the chopper output will appear. A first neutralizing capacitor 73 is connected between the emitter electrode 17 of the first transistor 11 and the second end terminal 29 of the drive transformer secondary 25, while a second neutralizing capacitor 75 is connected between the emitter electrodes 17 of the second transistor 13 and the first end terminal 23 of the drive transformer secondary 25. The cores of the drive transformer and the output transformer are connected to a common ground 33. The manner of operation of the full wave transistor chopper of FIG. 1 will be hereinafter described.

Figure 2:
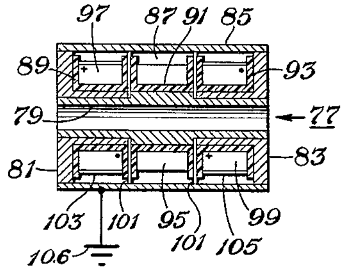
FIG. 2 is a schematic longitudinal section view showing a drive transformer structure and arrangement in accordance with a preferred embodiment of my invention.
Figure 3:
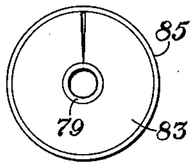
FIG. 3 is an end view of the drive transformer of FIG. 2.

In FIG. 2 there is shown a longitudinal section view of a drive transformer structure and arrangement 77 which may be utilized advantageously with the transistor choppers of the present invention; FIG. 3 being an end view of same. The drive transformer of FIGS. 2 and 3 includes a four part core structure made up of a center portion 79, a pair of identical end flange portions 81, 83 and a shell portion 85. The core center portion 79 is a cylinder having a center bore and exterior surface portions of reduced diameter at the cylinder end regions. Each flange portion 83 is simply a cylinder with an integral flange at one end thereof. Each flange cylinder has a center bore of diameter and length matching that of the core reduced diameter end regions. Each flange cylinder has a diameter matching that of the core central portion. Thus, when the flange portions 83 are mounted onto the core center portion 79, the assembly forms a bobbin or cylinder having a constant diameter and end flanges. The shell portion 85 of the core is simply a cylindrical sleeve having the same length as the core center portion and the same diameter as the flanges of the flange portions. Thus, when the shell is assembled with the core center and flange portions, a closed annulus 87 of rectangular transverse cross section is bounded by the shell inner surface, the inner surfaces of the flange portions, and the large diameter surface of the core center portion. Contained within the annulus are three juxtaposed coil bobbins 89, 91, 93. The center coil bobbin 91 carries the primary winding 95 of the transformer, while the two outer bobbins carry respective first and second portions 97, 99 of the transformer secondary winding. The center coil bobbin 91 is electrostatically isolated from the outer coil bobbins 89, 93 by means of thin non-magnetic metal wafers 101 which serve as partition walls for the annulus 87. The first secondary coil portion 97 is wound in the clockwise direction (looking from the righthand end in FIG. 2), while the second secondary coil portion 99 is wound in the counterclockwise direction. The outer end of the first secondary coil portion 97 is indicated by the "plus" in FIG. 2, as is the inner or beginning end of the second portion 99. The inner or beginning end of the first secodary coil portion 97 is indicated by the "dot" in FIG. 2, as is the outer end portion of the second secondary coil portion 99. In addition, a few turns 103, 105 of additional wire is wound on each section of the secondary bobbins for a purpose to be hereinafter explained. The core structure is grounded at 106 for electrostatic shielding purposes.

Figure 4:
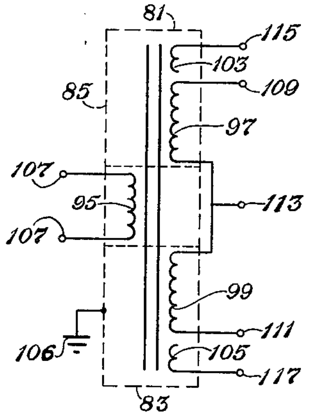
FIG. 4 is a schematic circuit diagram illustrating electrical connections and shielding arrangement for the drive transformer of FIG. 2.

The electrical connection and electrostatic shielding of the transformer structure of FIG. 2 is further illustrated by FIG. 4, wherein parts corresponding to FIG. 2 bear like reference numerals. In FIG. 4 the transformer primary, or input terminals, are designated as 107, the outer terminal of the first secondary section as 109, the outer terminal of the second secondary section as 111, and the center tap terminal (the inner ends of the secondary coil sections of FIG. 2 are connected together) as 113. The extra windings of FIG. 2 actually serve as capacitors and so each have only one terminal brought out, designated in FIG. 4 respectively as 115, 117. When the drive transformer of FIGS. 2, 3, and 4 is used in a full wave transistor chopper like that of FIG. 1, the corresponding terminals would be: 107–41, 109–23, 113–37, 111–29. Also capacitor 103 would correspond to 75 and terminal 115 would connect to the emitter electrode 17 of the second transistor 13, while capacitor 105 would correspond to 73 and terminal 117 would connect to the emitter electrode of the first transistor 11.

Figure 5:
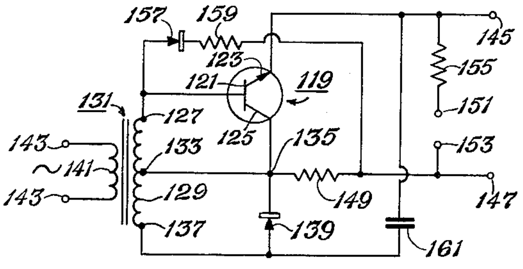
FIG. 5 is a schematic circuit diagram showing a half-wave transistor chopper in accordance with a preferred embodiment of my invention.

In FIG. 5 there is shown a schematic circuit diagram of a half wave transistor chopper utilizing principles of my invention. The half wave transistor chopper of FIG. 5 includes a single transistor 119 having a base electrode 121, an emitter electrode 123, and a collector electrode 125. The base electrode 121 is connected to a first end terminal 127 of the center-tapped secondary winding 129 of a drive transformer 131. The center tap terminal 133 of the secondary winding 129 is connected to a common terminal 135, to which the collector electrode 125 is also connected. The second end terminal 137 of the secondary winding 129 is connected in series with a first diode 139 to the common terminal 135; the diode 139 being poled to conduct in the direction toward the common terminal. The primary winding 141 of the drive transformer 131 has a pair of output terminals 143 which may be connected to a source of alternating current (not shown). The half wave transistor chopper has first and second output terminals 145, 147, the first output terminal being connected to the emitter electrode 123 and the second being connected in series with a neutralizing resistor 149 to the common terminal 135. The half wave transistor chopper has a pair of input terminals 151, 153 the first of which is connected in series with a current limiting resistor 155 to the first output terminal 145 and the second of which is common with the second output terminal 147. A second diode 157 is connected to the transformer secondary first end terminal 127 and in series with a voltage divider resistor 159 and the neutralizing resistor 149 to the common terminal 135. The second diode 157 is poled to conduct in the direction toward the common terminal. A capacitor 161 is connected between the emitter electrode 123 and the transformer secondary second end terminal 137.

In considering the operation of the transistor choppers shown in the drawings, it is assumed that the transistors are all of the NPN type and are operated in inverted fashion. Other types of transistors could of course be used, as is well understood by those skilled in the art. Referring now to FIG. 1, during a first half cycle of the alternating current drive voltage when the first end terminal 23 of the drive transformer secondary 25 is positive, the base electrode 15 of the first transistor 11 will be positive with respect to the collector electrode 19, so the first transistor will be conductive. This means that the circuit including the input terminals 65, 67, the upper half of the output transformer primary winding 59, the first transistor 11 emitter-collector, and the neutralizing resistor 49, will be closed; producing a first output pulse at the transistor chopper output terminals 71. During this same half cycle of drive voltage, the second transistor 13 will be non-conductive, so that it appears to the input terminals 65, 67 as an open switch. Then during a second half cycle when the second end terminal 29 of the drive transformer secondary 25 is positive, the second transistor 13 will be rendered conductive, producing a second output pulse at the transistor chopper output terminal 71; this pulse resulting from conduction through the lower half of the output transformer secondary 59. At this same time, the first transistor 11 will remain non-conductive, and will appear to the input terminals 65, 67 as an open switch. Thus, the two transistors 11, 13 are alternately conductive and non-conductive, acting as switches to produce a pulse at the output terminals 71 during each half cycle of the voltage at the drive transformer input terminals 41.

As hereinbefore mentioned, an important limiting factor in the application of transistor choppers has been the presence of noise in the output; this being a severe problem in operation at low signal levels where noise and signal magnitude is comparable. An important source of noise in the output of transistor choppers derives its existence from the fact that the transistors are not perfect switches. They do not have zero impedance when closed; nor infinite impedance when opened; nor are they capable of instantaneous opening and closing action; nor are they devoid of capacity coupling characteristics. Nothing can be done to change such inherent imperfections of transistors as switches, except perhaps in so far as they may be gradually minimized as the technology of transistor design and manufacture progresses. Consequently, it becomes essential to fiind ways to minimize the effects of such imperfections, and it is that problem to which important aspects of the present invention are directed.

One of the significant factors contributing to noise in the output of transistor choppers in the "offset voltage" including variations in same due to temperature drift. The "offset voltage" may be defined as the difference between voltage drops emitter-to-base and collector-to-base due to transistor internal or contact resistances. This "offset voltage" may be considered as between a transistor emitter and collector in the transistor chopper output circuit, and it acts to produce noise signals in the chopper output. During transistor ON time, in the circuit of FIG. 1 the "offset voltage" will be positive at the emitter electrode. In accordance with an important aspect of the present invention, this "offset voltage" is neutralized by a bucking voltage, so that its effects are not present in the chopper output. To accomplish this action in the transistor chopper of FIG. 1, the first and second diodes 43, 51, the first and second voltage divider resistors 45, 53, and the neutralizing resistor 49, are employed. The base-collector junctions of the transistors function as clippers so as to maintain the bucking voltage at a substantially constant selected level. Thus, during the ON time of a transistor, the voltage across the respective half of the drive transformer secondary winding is held substantially constant. This same voltage appears across the series combination of a diode, its associated voltage divider resistor, and the neutralizing resistor. Under these conditions, during manufacture of the chopper, the "offset voltage" is measured, and the value of the voltage divider resistor 45, 53 is chosen so as to produce a bucking voltage across the neutralizing resistor 49 which is equal to the "offset voltage." The neutralizing resistor is in the transistor chopper output circuit and the polarity of the voltage drop across it will be opposite to that of the "offset voltage," so that same will cancel out and have no effect at the transistor chopper output terminals.

Another of the significant factors contributing to noise in the output of transistor choppers derives from transistor OFF to ON and ON to OFF switching transients caused by the transistor emitter-to-base capacitance. Due to this capacitance, a voltage spike of one polarity is produced when the transistor switches ON and another voltage spike of opposite polarity is produced when the transistor switches OFF. In order to neutralize the effect of this phenomena, I provide a second capacitance, acting in opposite phase and equal magnitude to the one above-mentioned. In the circuit of FIG. 1, there is a neutralizing capacitor 73, 75 provided for each transistor 11, 13 each capacitor deriving its phase from a respective half of the drive transformer secondary winding 25. For example, in FIG. 1, when the first transistor 11 is switched ON and a voltage spike is being produced by the transistor emitter-to-base capacitance, a spike of opposite polarity and equal magnitude is being produced by the respective neutralizing capacitor 73. Thus, the transistor ON switching spikes are canceled. Similar action occurs when a transistor is switched to the OFF condition. The magnitudes of the neutralizing capacitors are of course chosen such that their capacitances will match the transistor emitter-to-base capacitance. It should be pointed out that due to the clipping action of the transistor base-collector junctions in the circuit of FIG. 1, on each half cycle of the drive voltage, the transistor emitter-to-base capacitance is held substantially constant.

In accordance with a further aspect of the present invention, the neutralizing capacitors 73, 75 may each consist of a few turns of wire wound onto respective halves of the drive transformer secondary winding 25, as indicated by reference numerals 103 and 105 in FIGS. 2 and 4. Such neutralizing capacitance arrangement, in addition to being simple, cheap, and compact, also provides minor variations in capacitance values matching similar minor variations in transistor emitter-to-base capacitance.

The drive transformer structure and arrangement as shown by FIGS. 2, 3 and 4, affords an effective electrostatic isolation of the transformer primary (and therefore the driving source) from the secondary outputs due to the electrostatic shielding provisions. Also, since the transformer secondary is wound in two equal parts on separate bobbins, the capacitances of the secondary windings are equal; and since these windings are oppositely wound and connected so that the capacitance effects are in bucking relation, the total capacitance effect of the transformer secondary is balanced and canceled out.

The operation of the half wave transistor chopper shown in FIG. 5 is similar to that of the full wave transistor chopper of FIG. 1 and therefore need not be set forth in detail herein. The diode 157, voltage divider resistor 159, neutralizing resistor 149, and neutralizing capacitor 161 serve the same respective functions as do those of FIG. 1. The transistor 119, however, is connected in shunt with the input terminals 151, 153 instead of in series as in FIG. 1. Also, the second diode 139 serves as a clipper to prevent the voltage on the upper half of the drive transformer secondary 129 from being higher on the reverse cycle than on the forward cycle of the driving voltage so that the transistor emitter-to-base capacitance is maintained substantially constant.

In actual practice, I have found that transistor choppers made in accordance with the principles of my invention as herein disclosed display amazingly low noise characteristics; typically, ten to one hundred times lower than heretofore obtainable and over wide temperature ranges. Also, transistor choppers utilizing the principles of my invention require only one transistor per switching operation and do not require matched transistor pairs. Thus, it should be apparent that I have provided transistor choppers which embody all of the inherent advantages of the utilization of transistors, while at the same time obviating the effects of inherent disadvantages of transistors for chopper applications.

The foregoing disclosure and the showings made in the drawings are merely illustrative of the principles of my invention, and are not to be interpreted in a limiting sense.

I claim:

1. A full wave transistor chopper comprising: first and second input terminals for connection to a source of signals to be chopped; first and second transistors each having a base electrode, an emitter electrode, and a collector electrode; a drive transformer having a primary winding and a center-tapped secondary winding having first and second end terminals; means connecting each end terminal of said secondary winding to a respective one of said base electrodes; means connecting the center tap terminal of said secondary winding to said collector electrodes; an output transformer having a center-tapped primary winding and a secondary winding; means connecting said emitter electrodes to respective end terminals of said output transformer primary winding; means connecting the center tap terminal of said output transformer primary winding to said second input terminal; a neutralizing resistor; means connecting said first input terminal in series with said neutralizing resistor to said collector electrodes; first and second diodes; first and second voltage divider resistors; means connecting the first said drive transformer secondary end terminal in series with said first diode and said first voltage divider resistor to said first input terminal; means connecting the second terminal of said drive transformer secondary end terminal in series with said second diode and said second voltage divider resistor to said first input terminal; said diodes each being poled to conduct in the direction toward said first input terminal; first and second neutralizing capacitors; means connecting said first neutralizing capacitor between the emitter electrode of said first transistor and the second end terminal of said drive transformer secondary; and means connecting said second neutralizing capacitor between the emitter electrode of said second transistor and the first end terminal of said drive transformer secondary.

2. A transistor chopper comprising: a transistor having a base electrode, an emitter electrode, and a collector electrode; driving means in circuit with said base and collector electrodes and producing a bias signal rendering said transistor alternately conductive and non-conductive; neutralizing means including a diode, a voltage divider resistor, and a neutralizing resistor connected serially between said base and collector electrodes; an output circuit for said chopper; and means connecting said neutralizing resistor in said output circuit; said neutralizing resistor producing a voltage equal and opposite to the "offset voltage" of said transistor.

3. A transistor chopper comprising: a transistor having base, emitter, and collector electrodes; driving means for receiving alternating current voltage; means for applying half cycles of said alternating current voltage of one polarity in circuit with said base and collector electrodes to produce a first bias voltage to render said transistor periodically conductive; an output circuit for said chopper; means for preventing a second bias voltage produced by half cycles of said alternating current of the opposite polarity from exceeding the magnitude of the first bias voltage produced by the half cycles of said one polarity; an output circuit for said chopper; and means for applying a portion of said first bias voltage equal to and in bucking relation to the transistor "offset voltage" in said output circuit.

4. A transistor chopper comprising: a transistor having base, emitter, and collector electrodes; driving means for applying bias voltage in circuit with said base and collector electrodes to render said transistor alternately conductive and non-conductive; means for regulating said bias voltage at a predetermined magnitude during the intervals when said transistor is conductive; an output circuit for said chopper; means for applying a portion of said bias voltage equal to and in bucking relation to the transistor "offset voltage" in said output circuit; a capacitor matching the emitter-to-base capacitance of said transistor; and means for applying voltage to said capacitor equal to but opposite in phase to the transistor base to collector voltage.

5. The invention in accordance with claim 1, wherein said drive transformer comprises a central core portion with a primary winding and two secondary windings juxtaposed on said core portion, said secondary windings being wound in opposite directions and having an equal number of turns, with the inner ends of said secondary windings adjacent said core being connected to said center tap terminal, and means for electrostatically isolating said primary winding from said secondary windings.

6. The invention in accordance with claim 5 wherein each said neutralizing capacitor is made up of a plurality of turns superimposed on a respective drive transformer secondary winding.

References Cited by the Examiner

UNITED STATES PATENTS

| | | | |
|---|---|---|---|
| 2,668,250 | 2/1954 | Henderson | 336—170 |
| 2,788,493 | 4/1957 | Zawels | 332—43 |
| 2,971,173 | 2/1961 | Kajihara | 336—170 |
| 3,003,122 | 10/1961 | Gerhard | 332—9 |
| 3,096,492 | 7/1963 | Vogt | 332—43 |
| 3,101,455 | 8/1963 | Masher | 332—43 |

ARTHUR GAUSS, *Primary Examiner.*

JOHN W. HUCKERT, *Examiner.*